United States Patent [19]

McNally

[11] Patent Number: 4,594,002

[45] Date of Patent: Jun. 10, 1986

[54] APPARATUS FOR ANALYZING COHERENT RADIATION

[75] Inventor: Mark J. McNally, Wilton, Conn.

[73] Assignee: The Perkin-Elmer Corporation, Norwalk, Conn.

[21] Appl. No.: 628,098

[22] Filed: Jul. 5, 1984

[51] Int. Cl.⁴ .............................................. G01J 9/02
[52] U.S. Cl. ..................................... 356/346; 356/352
[58] Field of Search ............................. 356/346, 352; 350/96.25

[56] References Cited

U.S. PATENT DOCUMENTS

| | | | |
|---|---|---|---|
| 3,551,051 | 12/1970 | Salgo | 356/352 X |
| 4,170,416 | 10/1979 | Fencil | 356/346 |
| 4,222,667 | 9/1980 | Layne | 356/346 |
| 4,309,108 | 1/1982 | Siebert | 356/352 |

Primary Examiner—Davis L. Willis
Assistant Examiner—Matthew W. Koren
Attorney, Agent, or Firm—Thomas P. Murphy; Edwin T. Grimes; Francis L. Masselle

[57] ABSTRACT

The present invention is directed to improvements in apparatus for analyzing coherent radiation in the presence of non-coherent ambient radiation subject to atmospheric scintillation effects, using unequal path interferometer apparatus and detector apparatus, said improvements comprising a closely packed bundle of fiber optic elements having an input face disposed adjacent the interferometer apparatus for receiving incident radiation passing therethrough, each of the elements being of a substantially smaller diameter than the atmospheric scintillation spatial structure; the said bundle of fiber optic elements having a medial portion wherein the elements are sorted or arranged into a plurality of subbundles; and said detector apparatus having a plurality of detector elements, each detector element being mounted adjacent one of the subbundles for being illuminated thereby.

12 Claims, 5 Drawing Figures

U.S. Patent  Jun. 10, 1986  Sheet 1 of 2  4,594,002
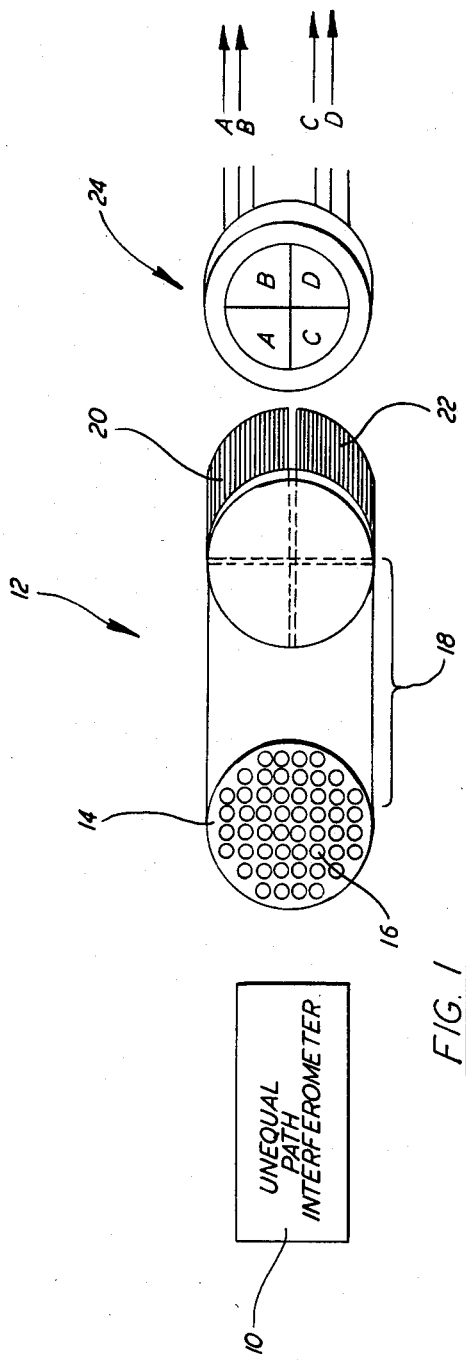
FIG. 1
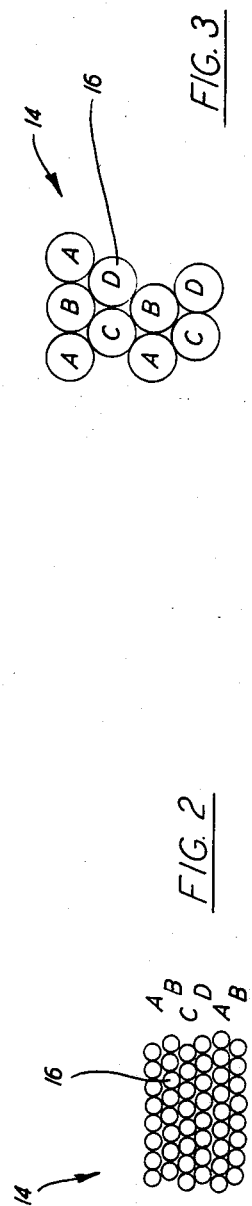
FIG. 3
FIG. 2

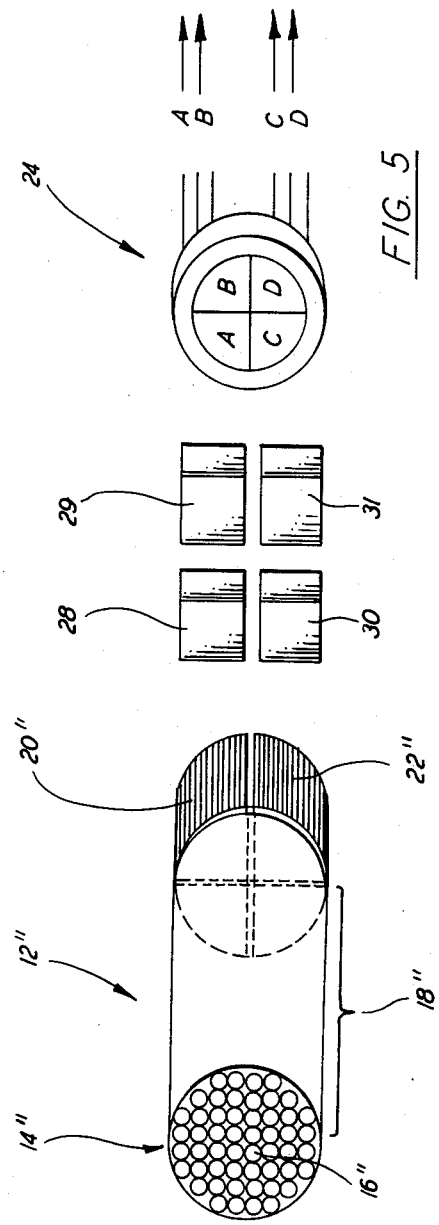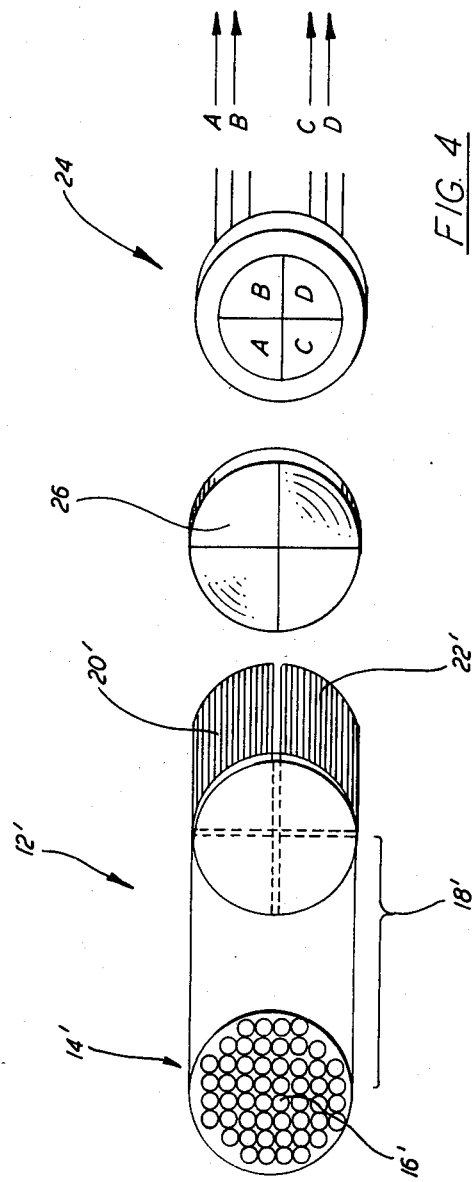

APPARATUS FOR ANALYZING COHERENT RADIATION

FIELD OF INVENTION

This invention relates to apparatus for analyzing coherent radiation. It is particularly adapted, among other possible uses, for analyzing coherent radiation passing through the earth's atmosphere.

Prior art apparatus, such as that described in U.S. Pat. No. 4,309,108, assigned to the same assignee as the present application, has met with success. The disclosure of this patent is incorporated in the present specification by reference. The apparatus of the present invention is directed to improvements over certain aspects of said prior art apparatus, as will become apparent as the description proceeds.

BACKGROUND OF THE INVENTION

Heretofore, difficulties were experienced due to atmospheric scintillation effects, which destroy the spatial coherence of the wavefront across a detected area. Differential atmospheric scintillation causes the intensities of laser and "point source" backgrounds to differ from detector to detector. While this is not a serious limitation in high flying aircraft, where atmospheric scintillation is spatially well correlated, it is an important limitation for low flying aircraft or ground systems. At ground level the spatial correlation distance of sunlight is of the order of a mere seven millimeters. In an unequal path interferometer system such as, for example, a Fizeau or a Fabry-Perot stepped-etalon system reliance is made on achieving coherent signal detection and absolute background and background scan noise (incoherent signal) rejection by means of balanced detectors and signal cancellation (subtraction) techniques.

Several proposals to mitigate this problem are set forth in the aforesaid U.S. Pat. No. 4,309,108. One proposal was to make all the detectors view the scene through a common aperture so that the light intensities incident on all parts of the etalon were identical. The means for equalizing the radiation intensity between the detectors, according to one form set forth in said patent resided in the provision of a beam-splitter wherein the radiation entering the beam-splitter was divided so that one portion passed through the beam dividing surface to a first one of the regions of the etalon and a second portion was reflected from the beam dividing surface to a second one of the regions of the etalon. Thus, a common aperture means was provided for directing radiation to all portions of the etalon. Preferably, according to said patent, the beam-splitter had a plurality of very small dots on the beam dividing surface, which were highly reflective and the spaces therebetween were highly transmitting.

In another form according to said prior art patent, equalization of the radiation intensity between the detectors was effected by means of providing an etalon having a plurality of regions of different thicknesses wherein the regions were in a form of a plurality of interdigitated steps. A plurality of detectors were provided corresponding in number to the etalon regions, said detectors having a plurality of interdigitated elements corresponding to the interdigitated steps of the etalon, that were adjacent or in contact therewith. The widths of the detector elements were made as small as possible.

In summary, where an optical signature is observed in a turbulent medium such as the atmosphere and where observations in different wavelength regions, or amplitudes, etc., are to be compared simultaneously, the spatial intensity fluctuations due to the turbulence or scintillation can not be cancelled or subtracted unless the simultaneous observations can be performed over a sampling distance which is small compared to the spatial fluctuation length. It is an object of the present invention to provide means for doing so which extends the lower size limit significantly beyond that achievable with prior art detector arrays, and which allows for the simultaneous observation of four or more wavelengths with a single chip detector which is essential to exactly match comparison circuits.

SUMMARY OF THE INVENTION

The present invention is directed to an improvement in an apparatus for analyzing coherent radiation in the presence of non-coherent ambient radiation subject to atmospheric scintillation effects, using unequal path interferometers means and detector means. Said improvement comprises a closely packed bundle of fiber optic elements having an input face disposed adjacent the interferometer means for receiving incident radiation passing therethrough. Each of the elements is substantially smaller in diameter than the atmospheric scintillation spatial structure. The bundle of fiber optic elements has a medial portion wherein the elements are arranged or sorted into a plurality of subbundles. The detector means has a plurality of detector elements, each detector element being mounted adjacent to one of said subbundles for being illuminated thereby.

In one form of the invention the interferometer means is replaced with neutral density and/or wavelength optical filters, arranged adjacent to the detector and behind the fiber subbundles, to provide analysis of the incoming radiation intensity and/or wavelength and/or other properties.

It will be appreciated that the interferometer is not constrained to be placed in front of the bundle of fiber optic elements. Separate interferometers can, under some circumstances, be mounted between the subbundles and the detector elements, in lieu of those in front of the end face.

According to one aspect of the invention the bundle of fiber optic elements are randomly arranged at the input face with respect to the plurality of detector elements. According to another aspect of the invention the bundles are in ordered arrangement at the input face to provide uniform distribution across the input face for each of the detector elements.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily by utilized as the basis for the designing of other apparatus for carrying out the several purposes of the invention. It is important, therefore, that this disclosure be regarded as including such equivalent apparatus as do not depart from the spirit and scope of the invention.

Several embodiments of the invention have been chosen for purposes of illustration and description, and are shown in the accompanying drawings, forming a part of the specification.

BRIEF DESCRIPTION OF THE DRAWINGS

FIG. 1 is a schematic drawing showing the interrelationship of a bundle of closely packed fiber optics elements with apparatus for analyzing coherent radiation, according to the invention;

FIG. 2 is a fragmentary end view of the input face of the fiber optic bundle according to a second embodiment of the invention;

FIG. 3 is an enlarged fragmentary end view of the fiber optic bundle according to a third embodiment of the invention;

FIG. 4 is a figure similar to FIG. 1, but showing another embodiment of the invention; and FIG. 5 is a figure similar to FIGS. 1 and 4, but showing still another embodiment of the invention.

DETAILED DESCRIPTION OF THE PRESENTLY PREFERRED EMBODIMENTS OF THE INVENTION

Referring to FIG. 1, the apparatus for analyzing coherent radiation in the presence of non-coherent ambient radiation subject to atmospheric scintillation effects comprises an unequal path interferometer 10. Fizeau or Fabry-Perot interferometers are particularly desirable. The interferometer processes an incoming signal in a manner such as is described, for example, in U.S. Pat. No. 4,309,108. A closely packed bundle of fiber optic elements, indicated generally at 12, has an input face 14 disposed adjacent the interferometer 10 for receiving incident radiation passing therethrough. Each of the elements such as the one indicated at 16 has a substantially smaller diameter than the atmospheric scintillation spatial structure. For example, the fiber optic element could have a diameter of the order of about 10 microns and the closely packed bundle could have a length of repetition between elements of the order of less than about 50 microns to about 100 microns. Also, said closely packed bundle could have a cross sectional area of the order of about one square centimeter.

The bundle of fiber optic elements has a medial portion 18 wherein the elements are sorted or arranged into a plurality of subbundles, one being indicated at 20 and another at 22. Detector means indicated at 24, have a plurality of detector elements corresponding in number to the number of fiber optics subbundles. For example, a single detector could have one element or it could have a plurality of elements such as the four shown in FIG. 1 at A, B, C and D. During assembly each fiber optic subbundle is carefully aligned adjacent its corresponding detector element. The output signals from the detector means are processed in a manner such as is described, for example, in U.S. Pat. No. 4,309,108.

FIG. 1 shows the individual fiber optic elements 16 as randomly arranged at the input face 14 with respect to the subbundles and, hence, with respect to the plurality of detector elements A, B, C and D. The fiber optic elements provide uniform input distribution across the input face. In some installations it is desirable to mount the individual fiber optic elements 16 in ordered arrangements, such as, for example, in rows at the input face as indicated at A, B, C, D, A and B in FIG. 2. In this case all of the elements denoted by A are sorted to a subbundle and mounted adjacent the detector element A, while the elements denoted by B are sorted to a subbundle and mounted adjacent the detector element B. In like manner the elements denoted by C and D are sorted to subbundles and mounted adjacent the detector elements C and D, respectively.

FIG. 3 shows another embodiment of the invention wherein the fiber optic elements 16 are mounted in ordered arrangement such as, for example, in polygonal arrays at the input face as indicated at A, B, C and D. In this case the elements denoted by A, B, C and D are sorted to subbundles and mounted adjacent the detector elements A, B, C and D, respectively.

Referring next to the embodiment of FIG. 4, the apparatus for analyzing coherent radiation in the presence of non-coherent ambient radiation subject to atmospheric scintillation effects includes neutral density and/or wavelength optical filters, indicated at 26, arranged adjacent to the detector means 24 and behind the fiber subbundles 20', 22' to provide analysis of the incoming radiation intensity and/or wavelength and/or other properties. In this embodiment the closely packed bundle of fiber optic elements is indicated at 12' and has an input face 14' for receiving the incoming signals. Each element 16' is similar to the elements 16 described in connection with the embodiment of FIG. 1. The outputs from the detector means 24 are processed in a manner such as is described, for example, in U.S. Pat. No. 4,309,108.

Referring next to the embodiment of FIG. 5, a plurality of unequal path interferometers indicated at 28, 29, 30 and 31 are provided, which correspond in number and are aligned with the subbundles 20", 22" and the elements A, B, C and D of the detector means 24. In this case the closely packed bundle of fiber optic elements is indicated at 12" and has an input face 14" for receiving the incoming signal. Each element 16" is similar to the elements 16 described in connection with the embodiment of FIG. 1. The output from the detector means 24" is processed in a manner such as is described, for example, in U.S. Pat. No. 4,309,108.

A feature of the present invention resides in the fact that each fiber optic element acts as an absolute field-of-view limit, thereby eliminating the need for special baffling members. That is, due to the acceptance angle of the fibers, they provide an automatic field-of-view cutoff.

It will thus be seen that the present invention does indeed provide new and improved detector inlet aperture means, which are useful in cooperation with apparatus for analyzing coherent radiation, that operate in a staring mode with no moving parts and negligible spatial dead space, and which provides means for extending the lower size limit significantly beyond that achievable with prior art detector arrays.

Although certain particular embodiments of the invention are herein disclosed for purposes of explanation, various modifications thereof, after study of this specification, will be apparent to those skilled in the art to which the invention pertains, reference should accordingly be had to the appended claims in determining the scope of the invention.

What is claimed is:

1. In apparatus for analyzing coherent radiation in the presence of non-coherent ambient radiation subject to atmospheric scintillation effects, using unequal path interferometer means and detector means, the improvement comprising:

a closely packed bundle of fiber optic elements having an input face disposed adjacent said interferometer means for receiving incident radiation passing therethrough, each of said elements being of a substantially smaller diameter than the atmospheric scintillation spatial structure;

said bundle of fiber optic elements having a medial portion wherein said elements are arranged in a plurality of subbundles;

said detector means having a plurality of detector elements, each detector element being mounted adjacent one of said bundles for being illuminated thereby.

2. Apparatus according to claim 1 wherein said bundle of fiber optic elements are randomly arranged at said input face with respect to the plurality of detector elements.

3. Apparatus according to claim 1 wherein said bundles are in ordered arrangement at said input face to provide uniform distribution across said input face for each of said detector elements.

4. Apparatus according to claim 1 wherein said closely packed bundle has a length of repetition between elements of the order of less than about 50 microns to about 100 microns.

5. Apparatus according to claim 1, wherein said closely packed bundle has an overall cross-sectional area of the order of about one square centimeter.

6. Apparatus according to claim 1 wherein each of said fiber optic elements had a diameter of the order of about 10 microns.

7. In apparatus for analyzing radiation in the presence of non-coherent ambient radiation subject to atmospheric scintillation effects, the improvement comprising:

a closely packed bundle of fiber optic elements having an input face positioned to receive incoming radiation, each of said elements being of a substantially smaller diameter than the atmosphere scintillation spatial structure;

said bundle of fiber optic elements having a medial portion wherein said elements are arranged in a plurality of subbundles;

optical filter means disposed adjacent to the output end of said subbundles for filtering out predetermined optical characteristics of the radiation emerging from said subbundles; and detector means having a plurality of detector elements, each detector element being arranged to be illuminated by radiation from one of said bundles after passing through said optical filter means.

8. Apparatus according to claim 7 wherein said bundle of fiber optic elements are randomly arranged at said input face with respect to the plurality of detector elements.

9. Apparatus according to claim 7 wherein said bundles are in ordered arrangement at said input face to provide uniform distribution across said input face for each of said detector elements.

10. An apparatus for analyzing radiation in the presence of non-coherent ambient radiation subject to atmosphere scintillation effects, the improvement comprising:

a closely packed bundle of fiber optic elements having an input face possitioned to receive incoming radiation, each of said elements being of a substantially smaller diameter than the atmosphere scintillation spatial structure;

said bundle of fiber optic elements having a medial portion wherein said elements are arranged in a plurality of subbundles;

detector means having a plurality of detector elements, each detector element being mounted to be illuminated by radiation from one of said subbundles; and a plurality of unequal path interferometer means, each of said interferometer means being interposed between one of said subbundles and its corresponding detector element.

11. Apparatus according to claim 10 wherein said bundle of fiber optic elements are randomly arranged at said input face with respect to the plurality of detector elements.

12. Apparatus according to claim 10 wherein said bundle of fiber optic elements are in ordered arrangement at said input face to provide uniform distribution across said input face for each of said detector elements.

* * * * *